Feb. 22, 1966 C. EMMONS Re. 25,955
GROOVING TOOL
Original Filed Nov. 19, 1962
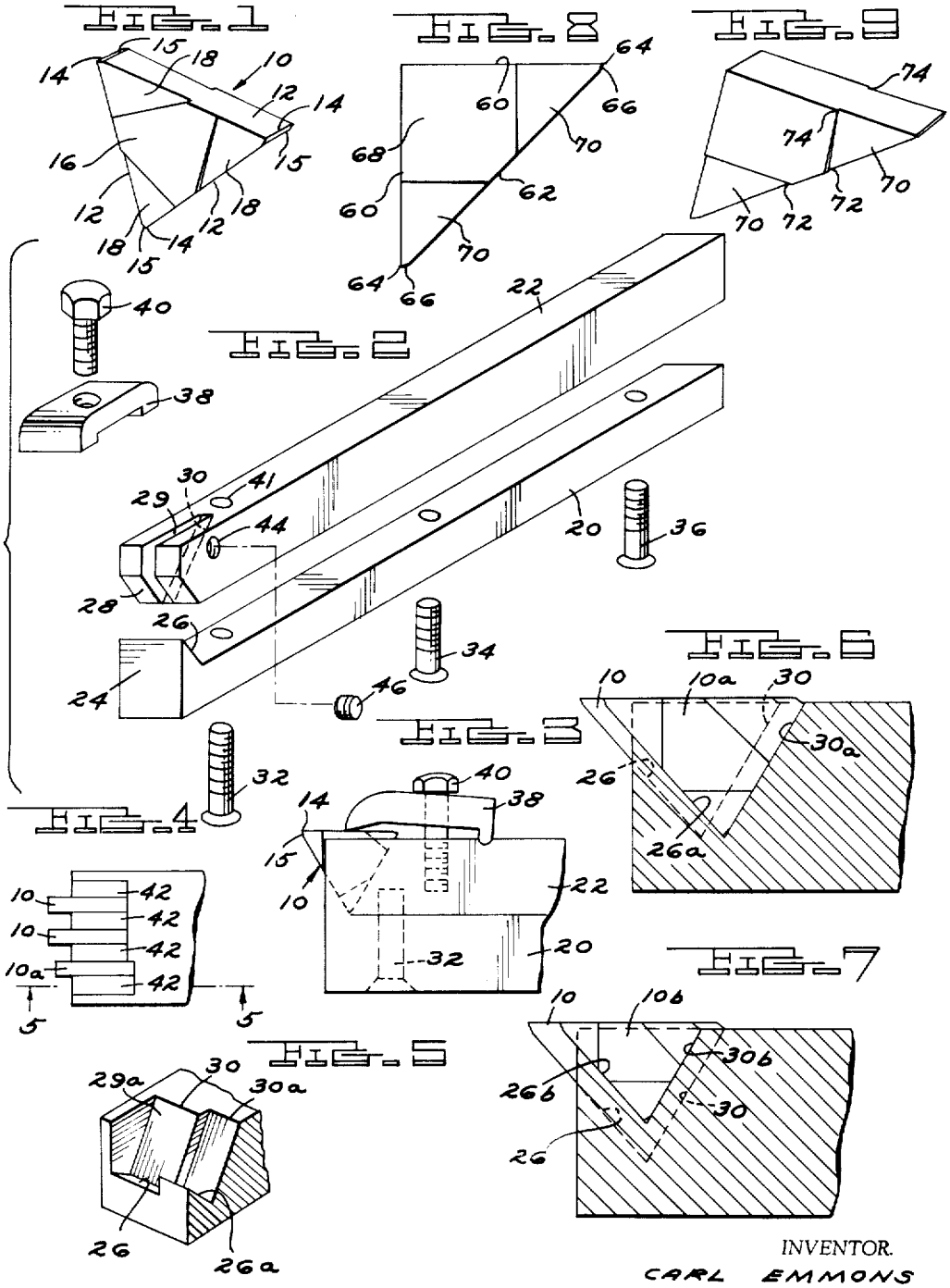
INVENTOR.
CARL EMMONS
BY
Barnes, Kisselle, Raisch & Choate
ATTORNEYS United States Patent Office Re. 25,955
Reissued Feb. 22, 1966

25,955
GROOVING TOOL

Carl Emmons, Tarpon Springs, Fla., assignor to U. S. Tool & Cutter Co., Franklin, Mich., a partnership Original No. 3,163,918, dated Jan. 5, 1965, Ser. No. 238,574, Nov. 19, 1962. Application for reissue Mar. 5, 1965, Ser. No. 452,957
13 Claims. (Cl. 29—95)

Matter enclosed in heavy brackets [ ] appears in the original patent but forms no part of this reissue specification; matter printed in italics indicates the additions made by reissue.

The present invention relates to a grooving tool and more particularly to a tool bit and tool holder especially adapted for cutting grooves in the outer diameter of cylindrical objects such as, for example, the cutting of piston ring grooves in pistons.

Prior to the present invention, there have been various cutting tools which have utilized a holder having a replaceable carbide tool bit positioned thereon. However, such prior art devices have utilized tool bits which present only a conventional cutting edge to the work piece. Such cutting edges must not only be fed into the work to determine the depth of the cut but must also be moved laterally along the work piece to determine the width of the cut. The face on which the cutting edge is formed is either too wide for successful grooving operation or it is not possible to utilize the entire width of the face for cutting a groove.

Accordingly, it is the principal object of the present invention to provide a cutting tool wherein a replaceable tool bit is retained on edge in a holder so that the cutting edge presented by the tool to the work piece extends across the full width of the bit and such full width is utilized to cut a groove in the work piece.

Another object of the invention is to provide a novel grooving tool wherein the tool bit and the holder cooperate to produce the following novel results:

(1) The tool bit is self-locating and self-locking.

(2) Pressure exerted on the cutting edge of the tool bit during a cutting operation serves only to more firmly seat the bit in the holder.

(3) Pressure exerted on the cutting edge of the tool bit during a cutting operation does not produce lateral stresses on the bit thereby eliminating vibration of the bit and fracture thereof and increasing the lift of the bit.

(4) An infinite variation in positioning of a plurality of tool bits in the holder is possible thereby providing for variation in the lateral spacing and depths of grooves to be cut in the work piece by the tool and also making it possible to work on different diameters of a work piece at the same time.

A further object of the present invention is to provide a novel tool bit for grooving tool whereby the cutting edge presented by the tool bit to the work piece is accurately dimensioned to predetermine the width of the cut which will be made as the cutting edge is indexed into the work piece.

Other objects of this invention will appear in the following description and appended claims, reference being had to the accompanying drawings forming a part of this specification wherein like reference characters designate corresponding parts in the several views.

FIG. 1 is a perspective view of a tool bit embodying the present invention.

FIG. 2 is an exploded view of a tool holder adapted for supporting the tool bit illustrated in FIG. 1.

FIG. 3 is a fragmentary side elevational view showing the manner in which the tool bit of FIG. 1 is supported on the tool holder of FIG. 2.

FIG. 4 is a top plan view of a modification of a tool holder showing a plurality of bits of the type illustrated in FIG. 1 mounted thereon.

FIG. 5 is a perspective sectional view taken along the line 5—5 of FIG. 4 with the tool bits removed.

FIG. 6 is a sectional view taken generally at the line 5—5 in FIG. 4.

FIG. 7 is a sectional view similar to FIG. 6 and showing a further modification of tool holder for mounting tool bits of different sizes.

FIG. 8 is a side elevational view of another form of tool bit of the present invention.

FIG. 9 is a perspective view of the tool bit illustrated in FIG. 8.

Referring to FIG. 1 of the drawings, the tool bit 10 of the present invention is formed of carbide or similar hard metal and is illustrated in the shape of an equilateral triangle. The edge faces 12 form three cutting edges 14 at the junction of adjacent edge faces. Thus, the bit has three cutting edges and when one cutting edge is dulled, the bit may be removed from its holder and reinserted to present a new cutting edge to the work piece. The side faces 16, only one of which is visible in FIG. 1, may be ground at their corner areas as illustrated at 18 to provide the cutting edge with the necessary side clearance As is illustrated in FIG. 1, the flat edge faces 12 are perpendicular to the side faces 16. The width of the slot which will be cut in the work piece is determined by the width of the cutting edge 14. In grinding the corner portions of the tool bit as at 18 to provide the necessary side clearance, it is preferable not to decrease the width of the cutting edges 14 so that they remain the same width as the spacing between the side faces 16. Furthermore, the ground faces 18 taper inwardly toward each other in a direction away from their associated cutting edge 14 so that as illustrated in FIG. 1, the side edges of each edge face 12 remain parallel adjacent each of the respective cutting edges. Each cutting edge 14 is also ground as at 15 to provide end or front clearance for the cutting edge. Experience has shown that the face 15 is ground at an angle of from about 5° to 12° rearwardly or inwardly from the edge face 12 which forms the top face of the cutting tool. Furthermore, experience has shown that with a tool bit of the type herein shown, the cutting edge should not be ground back from the apex in excess of about .040".

In FIG. 2 of the drawings, the holder for the tool bit is illustrated. The holder comprises a generally rectangular bottom portion 20 and a generally rectangular top portion 22. At the front end thereof, the bottom portion 20 is provided with an upward extension 24 to form a sloped seating surface 26 that slopes downwardly and rearwardly from the front end of the holder.

The lower front edge of the top portion 22 of the tool holder is cut rearwardly and downwardly to form an engaging face 28 to matingly engage the sloped seating surface 26 of the bottom portion of the tool holder. In the front end of the top portion 22 of the tool holder a slot 29 is cut to form the sloped seating face 30 that slopes upwardly and rearwardly. The sloped seating faces 26, 30 are normal to the vertical plane of slot 29.

The top and bottom portions of the tool holder are assembled by means of bolts 32, 34 and 36 or the like. The bolts 32, 34 and 36 extend through the bottom portion 20 and are threaded into tapped bores (not shown) in the top portion 22.

It can be seen that with the top and bottom portion of the tool holder assembled together, the seating face 26 and the seating face 30 diverge from each other upwardly toward the top of the tool holder. Two adjacent edge faces 12 of the insert 10 are received on these seating faces. Thus, the diverging seating faces form a seat into which the tool bit 10 is forced more firmly by the pressure exerted on the cutting edge 14 when the tool is in use. The seating face 30 is approximately equal in length to the length of an entire edge face 12. However, the seating face 26 is shorter and does not completely cover the edge face 12 of the tool bit which is seated thereon and thereby a cutting edge 14 of the tool bit is positioned outwardly from the front end of the tool holder. It is to be noted also that the included angle between the sloping faces 26 and 30 is equal to 60°. The bisector of this angle is generally perpendicular to the longitudinal axis of the tool holder and the entire tool is tilted longitudinally to provide a positive or negative rake for the tool bit. If desired, however, the seating faces may be cut so as to initially position the tool bit with a negative or positive rake when the tool is horizontal.

A clamping dog 38 is retained above the rear portion of the slot 29 by means of a bolt 40 that threads into a tapped bore 41 provided in the top face of the tool holder.

It has been found that in using the grooving tool of the present invention, the tool bit will remain within the slot 29 during the cutting operation with no clamping means whatsoever. Thus, the major purpose of the clamping dog 38 is as a chip breaker. Thus, no special machining of the tool bit 10 is necessary to provide engagement means for clamping mechanisms as are utilized by prior art devices. However, the use of the dog 38 as a clamping means is desirable since it aids in retaining the tool bit 10 within the slot 29 while the grooving tool is being handled and set up.

Referring to FIG. 4 of the drawings, there is shown a top plan view of the front end of a modified tool holder showing a plurality of tool bits 10, 10 and 10a of the type illustrated in FIG. 1 seated therein. As has been stated hereinbefore, the width of the cutting edges 14 of the tool bit are preferably kept equal to the total width of the edge faces 12. If it is desired to cut only one groove, this width and the width of the slot 29 are equal so that the tool bit will fit snugly in the slot as in the tool holders illustrated in FIGS. 2 and 3. However, in the majority of cases, the sizes of the grooves which it is desired to cut and the numbers and depth thereof will vary so that it is preferable to have a grooving tool which will be readily adapted for different situations. In FIG. 4, the slot is wide enough to accommodate a plurality of tool bits 10, 10 and 10a and spacing blocks 42. The tool bits 10, 10 and 10a may be of varying width depending upon the width of the grooves which are to be cut. The spacing blocks 42 which are interposed between the side faces of adjacent tool bits determine precisely the distance between the adjacent side faces, and thus determine precisely the distance between adjacent edges of the grooves which it is desired to cut. The blocks 42 which are positioned between the sides of the slot and the outer side faces of the tool bit need not be so accurately dimensioned as their purpose is to fill in the slot.

Additionally, referring to FIG. 4, it will be noted that the tool bit 10a extends a shorter distance past the end of the tool holder. This is accomplished in one way by varying the location of the seating faces as illustrated in FIGS. 5 and 6. In FIG. 5, the holder is illustrated with the tool bits removed and in FIG. 6, the holder is illustrated with the tool bits in place. It will be noted that slot 29a is stepped horizontally; that is, the seating face 30a is spaced further from the front of the tool holder than the seating face 30. The seating face 26a that cooperates with face 30a is also further back as compared to face 26. Thus, the seat for tool bit 10a of FIG. 4 formed by the seating faces 26a and 30a is stepped back from the end of the tool holder. At the same time, the vertical location of the seats is kept the same so that the top edges of the bits 10, 10 and 10a are even.

The just described modification of the seats is used if it is desired to utilize tool bits of equal dimensions.

Another way of accomplishing the same results is to utilize tool bits of different sizes as is shown in FIG. 7. For example, the tool bit 10b is smaller than the tool bits 10 and consequently extends a shorter distance past the end of the tool holder than the tool bits 10.

By using a tool bit 10b of the same shape but of smaller size than the size of tool bit 10, it is not necessary for the slot in which the tool bits are seated to be stepped horizontally. However, if it is desired to maintain the cutting edge of the tool bit 10b at the same height as the cutting edges of the tool bits 10, then the seating faces 26b–30b are raised symmetrically with respect to the seating faces 26–30 to compensate for the difference in size of the tool bits thus producing a vertically stepped configuration of the slot 29a.

Although only one stepped seat is illustrated, it is within the contemplation of the present invention to provide as many of such steps as may be desired for any specific groove cutting operation so that grooves of varying depth may be cut at one time or grooves may be cut simultaneously on different diameters of a work piece.

Referring again to FIG. 2, in order to aid in the locating of the tool bits 10 within the slot 29, it is sometimes desirable to use clamping means which will urge the tool bits against one side of the slot. For this purpose, a tapped bore 44 may be provided through one side of the tool holder and opening into the slot 29. The set screw 46 is threaded into this bore to urge the tool bit or the tool bits and spacing blocks against the opposite side of the slot 29.

Experience has shown that the tool bit in the arrangement illustrated in the drawings should not overhang in excess of about 58 percent of the distance between the cutting edge 14 and the lower apex of the tool bit. Accordingly, in the case of a relative deep cut or in the case of cutting a groove in a restricted space, in order to reduce the size of the tool bit, the tool bit may have a right angle shape as shown in FIGS. 8 and 9 as distinguished from the equilateral triangular shape of the tool bit shown in FIG. 1. The tool bit illustrated in FIGS. 8 and 9 has two perpendicularly related edge faces 60 and a diagonally extending edge face 62 which intersects the two edge faces 60 in cutting edges 64 which, as is the case with the cutting edges 14, are ground to provide an end clearance as at 66. The two side faces 68, only one of which is shown, are parallel and at the corners thereof adjacent the two cutting edges 64, the side faces are ground as at 70. The face portions 70 in the specific showing of FIGS. 8 and 9 taper inwardly and downwardly to provide the cutting edges 64 with side clearance. This is indicated by the offsets at 72. In addition, their faces 70 may be ground to provide the cutting edges 64 with back clearance in which case the side faces 70 also taper inwardly toward each other in a direction inwardly of the tool which is indicated by the very slight offsets at 74. The tool bit illustrated in FIGS. 8 and 9 is used substantially in the same manner as the tool bit illustrated in FIG. 1.

However, the holder for the tool bit illustrated in FIGS. 8 and 9 would be modified to the extent that the groove 30 shown on the holder illustrated in FIG. 2 would be perpendicular to the top face of the tool holder rather than being inclined thereto at an angle of about 60° as is the case with the tool holder shown in FIG. 2. Unlike the tool bit shown in FIG. 1, the tool bit illustrated in FIGS. 8 and 9 can be arranged on the holder so that the tool bit overhangs the front end of the holder in excess of about fifty-eight percent of the distance between the operative cutting edge 64 of the tool bit and the other cutting edge 64 seated within the holder.

From the above description, it can be seen that a triangularly shaped tool bit in accordance with the present invention is adapted to be retained within a suitably shaped holder with the side faces of the tool bit vertically disposed and with a plurality of cutting edges extending across the full width of the tool bit. The tool bit and holder are shaped such that the tool bit is positively seated in the holder by means of diverging seating faces in the holder which form a V-shaped seat for the edge faces of the tool bit. The edge faces of the tool bit, it will be noted, are in coplanar seating engagement with the seating faces in the holder and the pressure exerted on the cutting edge of the tool during a cutting operation serves only to more firmly seat the tool bit in its seat on the holder. The simplicity of the design of the tool holder and the bit leaves no room for error in the positioning of the tool bit in the holder. The skill of the operator need not be relied upon to correctly position the tool bit in the holder. The simplicity of this design also eliminates any complicated machining of the tool bit or the holder. The side faces of the tool bit are parallel and perpendicular to the edge faces thereof. Likewise, the groove in the tool holder for accommodating the bit is simply a vertically disposed groove with parallel side faces and flat converging seating faces.

This application is a continuation-in-part of my copending application Serial No. 833,529, filed August 13, 1959.

I claim:

1. A tool bit for cutting grooves in work pieces, the tool bit being of the type adapted to be seated in a tool holder having a triangularly shaped recess therein, said tool bit comprising a triangularly shaped body portion having a pair of flat parallel opposite side faces and three flat edge faces which are triangularly related, said edge faces being perpendicular to said side faces and intersecting at the corners of the triangular shaped body portion to form cutting edges, said cutting edges being perpendicular to said side faces and extending straight across the full width of said body portion, each of said cutting edges being defined in part by a small land on an adjacent edge face of the body portion providing end clearance for said cutting edge, said land being flat and lying in a plane perpendicular to said side faces, said land forming with the edge face of the body adjacent the edge face on which the land is formed an included angle of less than 90°, said side faces adjacent each cutting edge being relieved to provide side clearance of each cutting edge.

2. A tool bit as called for in claim 1 wherein said side clearance is such that when the bit is positioned with any of said cutting edges in its operative position, the body portion of the bit adjacent and inwardly of said cutting edge tapers with a decreasing thickness in a direction downwardly from said cutting edge and forms a generally triangularly shaped relief area one edge of which extends generally perpendicular to the top edge face of the bit in operative position.

3. A tool bit as called for in claim 2 wherein said tool is shaped as an equilateral triangle.

4. A tool bit as called for in claim 2 wherein said body portion is shaped as a right angle triangle, the cutting edges being located at the acute angles of the triangle and the edge face forming the hypotenuse of the triangle being common to both cutting edges.

5. A tool bit as called for in claim 4 wherein the acute angles of the triangle are 45°.

6. A tool bit for cutting grooves in work pieces, the tool bit being of the type adapted to be seated in a tool holder having a triangularly shaped recess therein, said tool bit comprising a triangularly shaped body portion having a pair of flat parallel opposite side faces and three flat edge faces which are triangularly related, said edge faces being perpendicular to said side faces and intersecting at the apexes of the body portion to form cutting edges, said cutting edges each constituting in its entirety a straight line perpendicular to the side faces of the body portion and being coextensive with the width of said body portion at said apexes thereof, each of said cutting edges being defined in part by a small land on an adjacent edge face of the body portion providing end clearance for said cutting edge, said land being flat and lying in a plane perpendicular to said side faces, said land forming with the edge face of the body adjacent the edge face on which the land is formed an included angle of less than 90°, both said side faces adjacent each cutting edge being relieved to provide side clearance for each cutting edge, the relieved areas being triangularly shaped with one edge thereof extending generally perpendicular to the top edge face of the bit in operative position.

7. A tool bit as called for in claim 6 wherein the width of each cutting edge corresponds to the full width of the body portion between said parallel side faces thereof.

8. A tool bit as called for in claim 6 wherein the body portion is of right triangular shape and the apexes provided with the cutting edges have an included angle of 45°.

9. A tool bit as called for in claim 6 wherein the body portion is shaped as an equilateral triangle and a cutting edge is provided at each apex of the triangle.

10. A tool bit as called for in claim 1, wherein said included angle is between 78° and 85°.

11. A tool bit as called for in claim 6, wherein said included angle is from 78° to 85°.

*12. A tool bit for cutting grooves in workpieces, the tool bit being of the type adapted to be seated in a tool holder having a triangularly shaped recess therein, said tool bit comprising a triangularly shaped body portion having a pair of flat parallel opposite side faces and three flat edge faces which are triangularly related, said edge faces being perpendicular to said side faces and intersecting at the corners of the triangularly shaped body portion to form cutting edges, said cutting edges extending across the full width of said body portion, each of said cutting edges being defined in part by a small land on an adjacent edge face of the body portion providing end clearance for said cutting edge, said land forming with the edge face of the body adjacent the edge face on which the land is formed an included angle of less than 90°, said side faces adjacent each cutting edge being relieved to provide side clearance of each cutting edge.*

*13. A tool bit for cutting grooves in workpieces, the tool bit being of the type adapted to be seated in a tool holder having a triangularly shaped recess therein, said tool bit comprising a triangularly shaped body portion having a pair of flat parallel opposite side faces and three flat edge faces which are triangularly related, said edge faces being perpendicular to said side faces and intersecting at the apexes of the body portion to form cutting edges, said cutting edges each being coextensive with the width of said body portion at the apexes thereof, each of said cutting edges being defined in part by a small land on an adjacent edge face of the body portion providing end clearance for said cutting edge, said land forming with the edge face of the body adjacent the edge face on which the land is formed an included angle of less than 90°, both said side faces adjacent each cutting edge being relieved to provide side clearance for each cutting edge, the relieved areas being triangularly shaped with one edge thereof extending generally perpendicular to the top edge face of the bit in operative position.*

References Cited by the Examiner

The following references, cited by the Examiner, are of record in the patented file of this patent or the original patent.

UNITED STATES PATENTS 2,838,827 6/1958 Wright ---------- 29—96

FOREIGN PATENTS 1,204,054 8/1959 France.

WILLIAM W. DYER, JR., *Primary Examiner.*

H. L. HINSON, *Assistant Examiner.*